US008267080B2

(12) United States Patent
Sundberg (10) Patent No.: US 8,267,080 B2
(45) Date of Patent: Sep. 18, 2012

(54) HYPOXIC CHAMBER FOR EUTHANASIA OF ANIMALS AND METHOD OF USE

(76) Inventor: Paul Sundberg, Ames, IA (US)

( * ) Notice: Subject to any disclaimer, the term of this patent is extended or adjusted under 35 U.S.C. 154(b) by 700 days.

(21) Appl. No.: 12/393,732

(22) Filed: Feb. 26, 2009

(65) Prior Publication Data

US 2010/0212599 A1 Aug. 26, 2010

(51) Int. Cl.
*A61G 10/00* (2006.01)
(52) U.S. Cl. ............... 128/202.12; 119/416; 119/420
(58) Field of Classification Search .......... 119/416, 119/420; 128/202.12
See application file for complete search history.

(56) References Cited

U.S. PATENT DOCUMENTS

| | | | |
|---|---|---|---|
| 3,356,087 A | 12/1967 | Guttman | |
| 4,107,818 A | 8/1978 | Scott et al. | |
| 5,290,775 A | 3/1994 | Sawyer et al. | |
| 7,112,591 B2 | 9/2006 | Stone et al. | |
| 7,341,023 B2 | 3/2008 | Caplette | |
| 2005/0095969 A1 | 5/2005 | Mosher | |
| 2006/0086038 A1 | 4/2006 | Mosher | |
| 2009/0126647 A1* | 5/2009 | Anderson et al. | 119/420 |

OTHER PUBLICATIONS

Opinion of the Scientific Panel on Animal Health and Welfare on a request from the Commission related to welfare aspects of the main systems of stunning and killing the main commercial species of animals, The EFSA Journal (2004), 45, 1-29.
European Food Safety Authority—AHAW/04-027, Welfare Aspects of Animal Stunning and Killing Methods, Scientific Report of the Scientific Panel for Animal Health and Welfare on a request from the Commission related to welfare aspects of animal stunning and killing methods.
Summary of Opinion of the Scientific Panel on Animal Health and Welfare on a request from the Commission related to welfare aspects of the main systems of stunning and killing the main commercial species of animals, EFSA Journal (2004), 45, Welfare aspects of the main systems of stunning and killing the main commercial species of animals.
National Pork Board, On-Farm Euthanasia of Swine—Recommendations for the Producer, 2008.

* cited by examiner

*Primary Examiner* — Glenn Richman
(74) *Attorney, Agent, or Firm* — Brick Gentry PC; Brian J. Laurenzo (57) ABSTRACT

A euthanasia device is provided for euthanizing animals through hypoxia. The euthanasia device has a pressure adjustment vessel having an inner chamber and first and second ends. A chamber access door is in communication with the first end of the pressure adjustment vessel. Further an atmospheric pressure adjustment assembly and an atmospheric pressure control assembly are in communication with the pressure adjustment vessel. A method of use for the euthanasia device is also disclosed.

14 Claims, 7 Drawing Sheets

HYPOXIC CHAMBER FOR EUTHANASIA OF ANIMALS AND METHOD OF USE

FIELD OF THE INVENTION

The present invention generally relates to devices used for euthanasia of animals. More specifically, the present invention relates to a chamber which causes hypoxia to euthanize animals.

BACKGROUND

Euthanasia is the process of rendering an animal insensible, with minimal pain and distress, until the onset of death. Death must be quick, effective and reliable for the method of euthanasia to be deemed humane. Various devices, processes and methods are presently known and used for euthanizing animals. While effective, each has certain limitations.

One method of euthanizing animals is gaseous euthanasia. The animal is first placed into a chamber, wherein a gas is introduced. For example, U.S. Pat. No. 4,107,818 to Scott et al. discloses a device for using gas to euthanize animals. Gases used may include carbon dioxide, nitrous oxide, and chloroform vapor. The gas replaces oxygen in the body of the animal, leading first to unconsciousness and resulting in death through respiratory arrest. However, this method requires procurement of the gases used for the euthanasia process. The gases must be of a substantial purity to be effective. Further, the gases are often specially manufactured, compressed and placed in special canisters for transportation and storage. Accordingly, it would be advantageous to euthanize animals without the additional cost, handling, and storage of specialized compressed gasses.

Another method of euthanizing animals is physical euthanasia. This may include euthanasia by gunshot, captive bolt (penetrating or non-penetrating), blunt force trauma, or electrocution. While physical euthanasia can be effective, it may involve substantial risk to the animal and person administering the euthanasia. Correct positioning of the physical implement is critical for proper euthanasia; otherwise the result may merely stun, maim or cripple the animal and may require a secondary euthanasia step, such as exsanguination or pithing. The person administering the euthanasia, onlookers and nearby animals may also be at risk of physical injury from the euthanasia tool, for example a stray bullet or malfunctioning bolt-gun, or from the animal receiving euthanasia. As an additional drawback, a physical method of euthanasia may also be aesthetically objectionable, not only from the residual appearance, but also due to the animal exhibiting tonic and clonic movements. Accordingly, it would be advantageous to consistently and reliably euthanize animals while limiting the risk to individuals administering the euthanasia, onlookers, or other nearby animals.

Another method of euthanizing animals is by anesthetic overdose. This method requires intravenous injection of a euthanasia solution, often barbiturates, which depress the central nervous system and result in respiratory and cardiac arrest. Since the euthanasia solution is a controlled substance, Federal drug regulations require the solution to be purchased, stored and used under the supervision of an individual registered with the United States Drug Enforcement Administration, such as a licensed veterinarian. Unfortunately, licensed veterinarians are not always readily available when an animal requires euthanasia, resulting in prolonged physical distress. Further, special steps must be taken when disposing of the animal carcass to prevent exposure of chemical residues to scavenging animals. Accordingly, it would be advantageous to readily euthanize animals without the need of intravenous injection by a licensed individual and without the risk of chemical exposure to other animals.

SUMMARY

A euthanasia device is provided for euthanizing animals through hypoxia. The euthanasia device has a pressure adjustment vessel having an inner chamber and first and second ends, a chamber access door in communication with the first end of the pressure adjustment vessel, an atmospheric pressure adjustment assembly in communication with the pressure adjustment vessel and an atmospheric pressure control assembly in communication with the pressure adjustment vessel.

A hypoxic euthanasia device for euthanizing animals is also provided. The euthanasia device includes a pressure adjustment vessel having a top portion, a chamber access door attached to the pressure adjustment vessel by a chamber access retention device, an atmospheric pressure adjustment assembly and atmospheric pressure control assembly in communication with the pressure adjustment vessel, and an inspection portal in communication with the top portion of the pressure adjustment vessel.

A method of using the euthanasia device is also provided. In the method, an animal is placed inside the pressure adjustment vessel and the chamber access door is sealed. The euthanasia process is initiated by actuation of the atmospheric pressure control assembly. The atmospheric control assembly signals the atmospheric pressure adjustment assembly to reduce the atmospheric pressure inside the pressure adjustment vessel according to pre-programmed criteria in the atmospheric pressure control assembly, causing hypoxia of the animal.

One or more embodiments of the present invention result in advantages not provided by euthanasia devices known in the art. Specifically, the hypoxic euthanasia device provides a quick, effective and humane method of euthanasia by simulating the atmospheric pressure of high altitude and using hypoxia to euthanize an animal. In addition, the hypoxic euthanasia device allows for euthanasia of animals without risk to other animals from poisons or chemicals. Moreover, the hypoxic euthanasia device is not aesthetically objectionable to individuals administering the euthanasia or onlookers. Further, the hypoxic euthanasia device allows for euthanasia of animals while minimizing the risk of injury to the person administering euthanasia, onlookers or nearby animals. In addition, the euthanasia process is dependable and reliable, minimizing the necessity for a secondary euthanasia step. Further, the hypoxic euthanasia device reduces costs, and does not require handling and storage of additional chemicals, gases, equipment, or raw materials. Moreover, the hypoxic euthanasia device may be used without licensed or specialized personnel, minimizing the amount of time an animal may suffer before euthanasia.

DETAILED DESCRIPTION

The following presents one or more examples of embodiments of a hypoxic euthanasia device or assembly 100. For ease of discussion and understanding, the following detailed description and illustrations refer to the hypoxic euthanasia device or assembly 100 for use with swine and more specifically, euthanasia of domesticated pigs or hogs. It should be appreciated that "swine," "pigs," and "hogs" are provided merely for purposes of illustration and the hypoxic euthanasia device or assembly 100 may be used for euthanasia of any animal which takes in oxygen through respiration.

FIGS. 1-5 illustrate a hypoxic euthanasia device or assembly 100 in accordance with one or more examples of embodiments of the present invention. The hypoxic euthanasia device or assembly 100 generally may include a pressure adjustment vessel 110 for artificial creation of an environment with a different atmospheric or air pressure than the outside of the vessel. The hypoxic euthanasia device or assembly 100 may also include a chamber access assembly 120 allowing access into the pressure adjustment vessel 110, an atmospheric pressure adjustment device 140 for adjusting the atmospheric or air pressure within the pressure adjustment vessel 110, and an atmospheric pressure control device 160 for controlling and regulating the atmospheric or air pressure within the pressure adjustment vessel 110.

As illustrated in FIGS. 1-5, the pressure adjustment vessel or chamber or assembly 110 is generally cylindrical or tubular in shape, but it is contemplated that the pressure adjustment vessel or chamber or assembly 110 may be formed of any shape without departing from the overall scope of the present invention. The pressure adjustment vessel or chamber or assembly 110 may be formed of different lengths, widths and diameters to compensate for different uses, and specifically different sized animals. The pressure adjustment vessel or chamber or assembly 110 is generally formed of steel or other similar material of sufficient strength to withstand variable or changing internal atmospheric pressure and the stresses placed upon the pressure adjustment vessel or chamber or assembly 110 thereby. To this end, the pressure adjustment vessel or chamber or assembly 110 may be formed of carbon fiber, copper, aluminum, synthetic material, composite material, or any other known or future discovered material with sufficient strength to structurally withstand changing internal pressure conditions, and specifically to withstand low atmospheric pressure within the pressure adjustment vessel or chamber or assembly 110.

Figure 1:
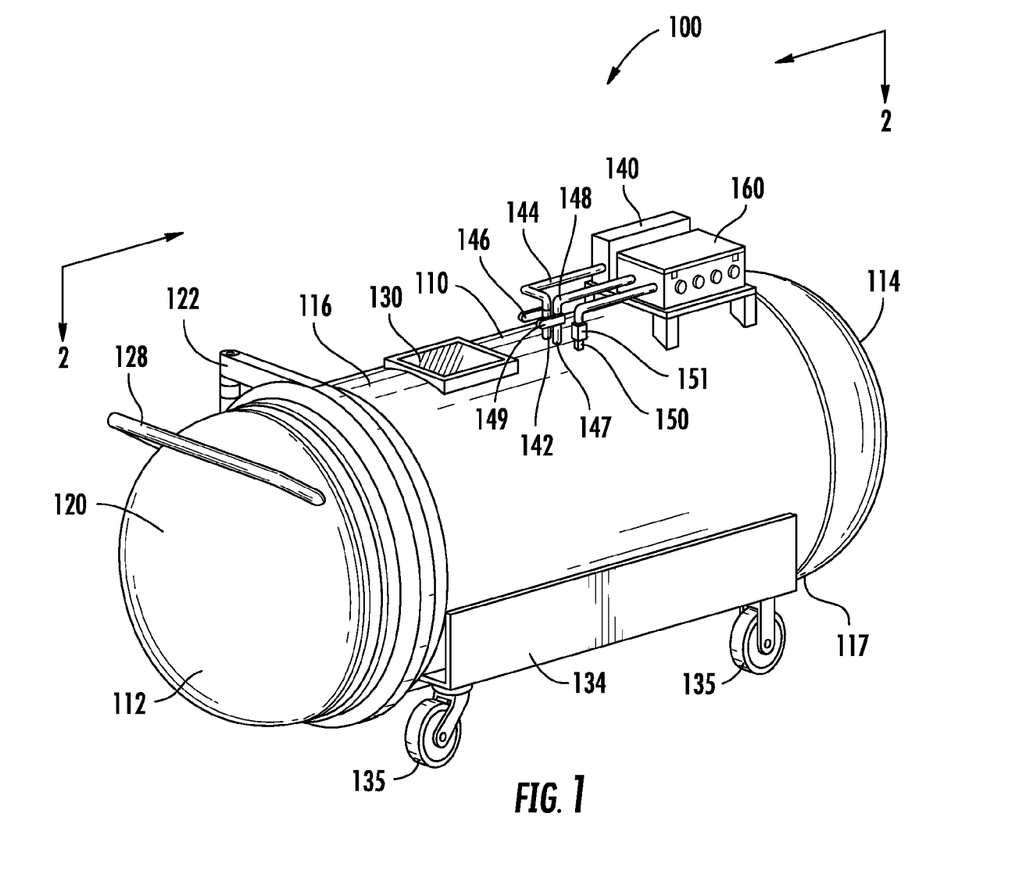
FIG. 1 is an isometric view of a hypoxic euthanasia device according to one of more examples of embodiments, illustrating the outside structural features of the euthanasia device.
Figure 2:
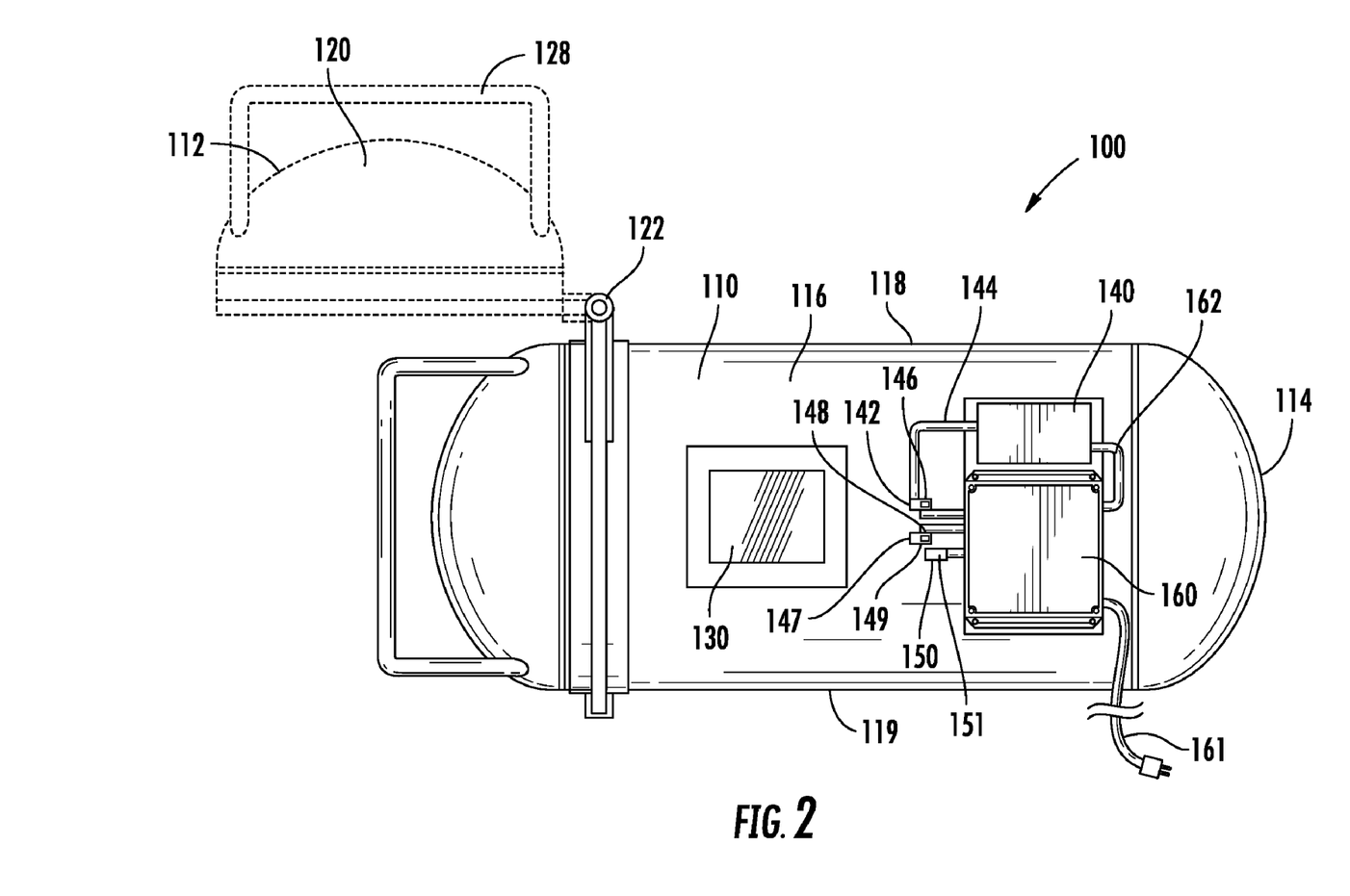
FIG. 2 is a top down view of the hypoxic euthanasia device of FIG. 1 taken along line 2-2 of FIG. 1, showing the chamber access door in an open position in dashed lines.
Figure 3:
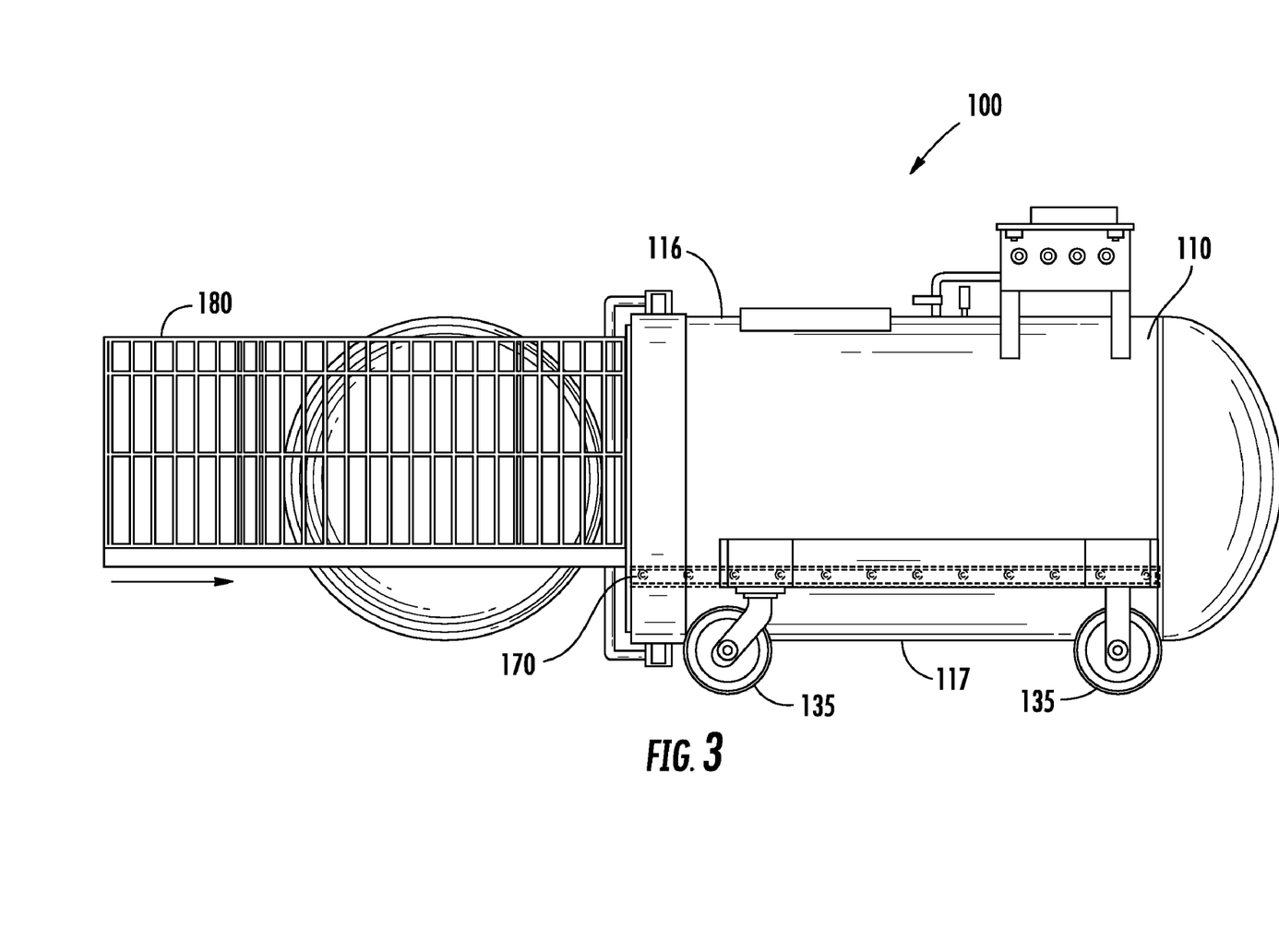
FIG. 3 is a side view of the hypoxic euthanasia device of FIG. 1, showing the chamber access door in an open position and the animal retention device slidably received by the pressure adjustment vessel.
Figure 4:
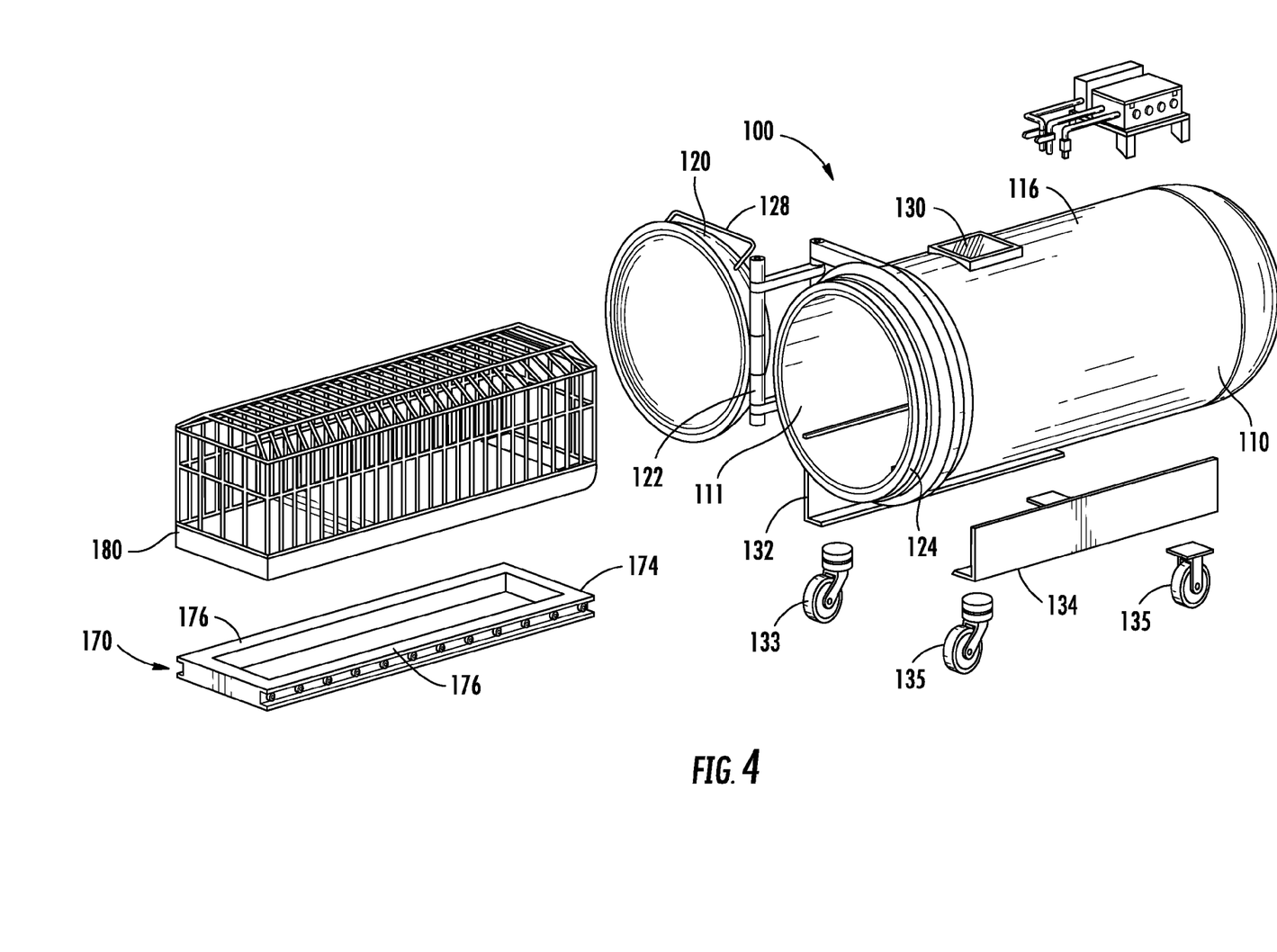
FIG. 4 is an exploded view of the hypoxic euthanasia device of FIG. 1.

The pressure adjustment vessel 110 may include an inside or inner chamber 111, a first end 112, a second end 114, a top side or portion 116, a bottom side or portion 117, a first side or portion 118, and a second side or portion 119. As best illustrated in FIG. 4, the pressure adjustment vessel or chamber or assembly 110 may be substantially hollow to form the inside or inner chamber 111. As illustrated in FIGS. 1 and 3, top side or portion 116 and bottom side or portion 117 may extend generally parallel to one another and extend generally along all or a portion of the pressure adjustment vessel 110. The top side or portion 116 is generally a distance away from the ground or surface, while the bottom side or portion 117 is generally closer to the ground or surface. As shown in FIG. 2, the pressure adjustment vessel or chamber or assembly 110 may include a first side or portion 118 and second side or portion 119 which may extend generally parallel to one another and extend generally longitudinally along all or a portion of the pressure adjustment vessel 110. The first side or portion 118 and second side or portion 119 may be spaced apart from each other by the top side or portion 116 and the bottom side or portion 117. Further, as illustrated in FIGS. 1 and 2, the first side or portion 118 and second side or portion 119 may be spaced apart from each other by the first end 112 and second end 114. The first end 112 and second end 114 may be spaced apart from each other by the top side or portion 116 and the bottom side or portion 117, and by the first side or portion 118 and second side or portion 119 of the pressure adjustment vessel 110.

As illustrated in FIGS. 1, 2 and 4, the chamber access door 120 may be formed by a portion of the pressure adjustment vessel 110. The chamber access door 120 may be positioned at the first end 112 of the pressure adjustment vessel 110. In one or more examples of embodiments, the chamber access door or assembly 120 may by positioned at the second end 114 of the pressure adjustment vessel 110. Further, in one or more examples of embodiments, the pressure adjustment vessel 110 may have two chamber access doors 120 positioned at both the first end 112 and second end 114 of the pressure adjustment vessel 110. The chamber access door or assembly 120 may be formed of similar material as the pressure adjustment vessel 110. Further, the chamber access door or assembly 120 may be formed of any other suitable material with sufficient strength to structurally withstand changing internal pressure conditions, and specifically to withstand low atmospheric pressure within the pressure adjustment vessel or chamber or assembly 110.

The chamber access door 120 may include a chamber access retention device or assembly 122 to enable separation of the chamber access door 120 from the pressure adjustment vessel 110. As shown in FIGS. 1 and 2, the chamber access retention device or assembly 122 may attach or connect the chamber access door 120 with the pressure adjustment vessel 110. The chamber access retention device or assembly 122 may be a barrel hinge mounted or attached to the first side or portion 118 of the pressure adjustment vessel 110. In one or more examples of embodiments, the chamber access retention device or assembly 122 may be a detention hinge, spring hinge, or any other hinged member mounted, attached, or interconnecting the chamber access door 120 to the pressure adjustment vessel 110. Further, in one or more examples of embodiments, the chamber access retention device or assembly 122 may be attached or mounted to the top side or portion 116, the bottom side or portion 118, or the second side or portion 119 of the pressure adjustment vessel 110.

Figure 6:
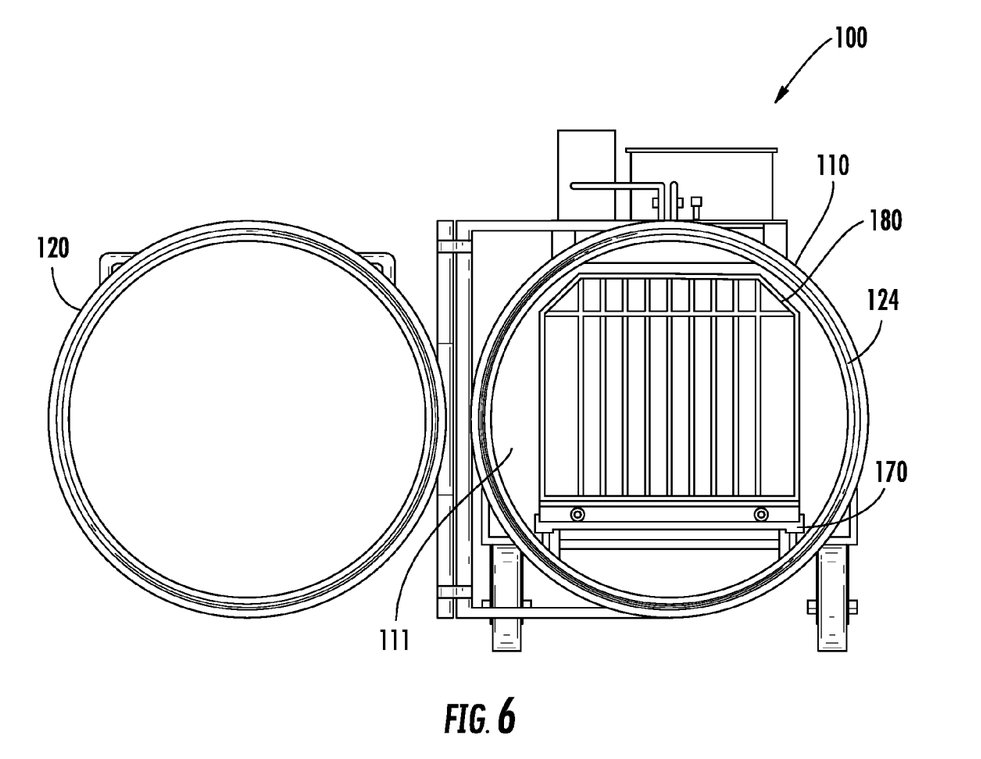
FIG. 6 is an end view of the hypoxic euthanasia device of FIG. 1, showing the chamber access door in an open position and showing the animal retention device positioned within the pressure adjustment vessel.

The pressure adjustment vessel 110 may also include a chamber sealing device or structure 124. As illustrated in FIGS. 4 and 6, the chamber sealing device 124 may create a temporary seal between the pressure adjustment vessel 110 and the chamber access door 120 when the chamber access door 120 is closed or engaged with the pressure adjustment vessel 110. The chamber sealing device 124 may be a rubber O-ring. In one or more examples of embodiments, the chamber sealing device 124 may be a sheet gasket, spiral-wound gasket, extrusion gasket, kammprofile gasket, or other type of mechanical seal or gasket sufficient to seal the chamber access door 120 with the pressure adjustment vessel 110 during operation of the hypoxic euthanasia device 100. Further, in one or more examples of embodiments, the chamber sealing device 124 may be formed of plastic, silicone, VITON™, thermoplastic, or other natural or synthetic material sufficient to seal the chamber access door 120 with the pressure adjustment vessel 110 during operation of the hypoxic euthanasia device 100.

The pressure adjustment vessel 110 may include a locking arrangement. During operation of the hypoxic euthanasia device 100, the lower atmospheric pressure within the inner chamber 111 of the pressure adjustment vessel 110 generated by the operation of the atmospheric pressure adjustment assembly 140 may be sufficient to restrict the opening or lock the chamber access door 120 to the pressure adjustment vessel 110.

The pressure adjustment vessel 110 may optionally include a locking assembly (not shown). The locking assembly may lock or restrict the opening or separation of the chamber access door 120 from the pressure adjustment vessel 110. The locking assembly may be used during transportation or movement of the pressure adjustment vessel 110 to avoid unintended opening and closing of the chamber access door 120. The locking assembly may be sufficient to lock the chamber access door 120 to the pressure adjustment vessel 110 during operation of the hypoxic euthanasia device 100. The locking assembly may be a manual latching or locking device, such as, for example, an over-center draw latch mounted or attached to the second side or portion 119 of the pressure adjustment vessel 110. In one or more examples of embodiments, the locking assembly may be a cam latch, compression latch, wire link latch, rotary action draw latch, tension latch, or any other commercially available lock, or latch or clamp device restricting separation of the chamber access door 120 from the pressure adjustment vessel 110. In one or more examples of embodiments, the locking assembly may be attached or mounted to the top side or portion 116, the bottom side or portion 118, or the first side or portion 118 of the pressure adjustment vessel 110.

The pressure adjustment vessel 110 may include a push bar 128. As shown in FIGS. 1, 2 and 4, the push bar 128 may be attached or connected to the chamber access door 120 at the first end 112 of the pressure adjustment vessel 110. The push bar 128 may be attached to the pressure adjustment vessel 110 by welding. In one or more examples of embodiments, the push bar 128 may be attached or connected at the second end 114 of the pressure adjustment vessel 110. Other embodiments of the push bar 128 may include alternative methods of attachment to the pressure adjustment vessel 110, which may include, but are not limited to, bolting, riveting, and integrally incorporating the push bar 128 into the chamber access door 120 or pressure adjustment vessel 110.

As illustrated in FIGS. 1 and 2, the pressure adjustment vessel 110 may include an inspection or viewing portal 130. While the illustrated inspection or viewing portal 130 is generally connected to the top side 116 of the pressure adjustment vessel 110, in one or more examples of embodiments, the inspection or viewing portal 130 may be connected to the first end 112, second end 114, first side 118 or second side 119 of the pressure adjustment vessel 110. Further, while the illustrated inspection or viewing portal 130 is generally square in shape, in one or more examples of embodiments, the inspection or viewing portal 130 may be circular, triangular, or any other geometric shape without departing from the overall scope of the present invention. The inspection or viewing portal 130 may be formed of PLEXIGLAS™, glass, polycarbonate, acrylic, thermoplastic or other transparent material. The inspection or viewing portal 130 may be connected to the pressure adjustment vessel 110 by being received or incorporated into an aperture within the pressure adjustment vessel 110. In one or more examples of embodiments, the inspection or viewing portal 130 may be connected to the pressure adjustment vessel 110 by bolt, adhesive, or any other known or future developed method of attachment.

The pressure adjustment vessel 110 may include a first wheel assembly 132 and a second wheel assembly 134. As illustrated in FIGS. 1 and 4, the first wheel assembly 132 may be attached to the first side 118 of the pressure adjustment vessel 110. The first wheel assembly 132 may have first wheels 133. As illustrated, a plurality of wheels, and more specifically two wheels 133 may be provided. The first wheel assembly 132 may enable one of first wheels 133, positioned toward the first end 112 of the pressure adjustment vessel 110, to swivel about the first wheel assembly 132 and swivel independently of the other wheel, which may be rigidly positioned toward the second end 114 of the pressure adjustment vessel 110. The second wheel assembly 134 may be attached to the second side 119 of the pressure adjustment vessel 110. The second wheel assembly 134 may have second wheels 135. As illustrated, a plurality of wheels, and more specifically two wheels 135 may be provided. The second wheel assembly 134 may enable one of second wheels 135, positioned toward the first end 112 of the pressure adjustment vessel 110 to swivel about the second wheel assembly 134 and swivel independently of the other wheel, which may be rigidly positioned toward the second end 114 of the pressure adjustment vessel 110. In one or more examples of embodiments, first wheels 133 and second wheels 135 may include only a single wheel. In one or more examples of embodiments, first wheel assembly 132 generally may include first wheels 133 maintained in a rigid position, or able to swivel about the first wheel assembly 132 and swivel independently of each other. Further, in one or more examples of embodiments, second wheel assembly 134 may include second wheels 135 maintained in a rigid position, or able to swivel about the second wheel assembly 134 and swivel independently of each other. The first and second wheels 133, 135 may be formed of caster wheels. In one or more examples of embodiments, first wheel assembly 132 and second wheel assembly 134 may be connected by a plurality of axles (not shown), and more specifically two axles. The first axle (not shown) may be positioned toward the first end 112 of the pressure adjustment vessel 110. The second axle (not shown) may be positioned toward the second end 114 of the pressure adjustment vessel 110. Connected at each end of the first axle may be a first and second wheel (not shown). Connected at each end of the second axle may be a third and fourth wheel (not shown).

As illustrated in FIGS. 1 and 2, the atmospheric pressure adjustment assembly or device 140 may be attached to the top portion 116 of the pressure adjustment vessel 110. The atmospheric pressure adjustment assembly or device 140 may be a vacuum pump. In one or more examples of embodiments, the atmospheric pressure adjustment assembly or device 140 may be a positive displacement pump, which may include, but is not limited to, a rotary vane pump, diaphragm pump, liquid ring pump, piston pump, or a scroll pump. In one or more examples of embodiments, the atmospheric pressure adjustment assembly or device 140 may be attached to the pressure adjustment vessel 110 by bolt, weld, adhesive, or any other known or future developed method of attachment. In one or more examples of embodiments, the atmospheric pressure adjustment assembly or device 140 may be attached to the first end 112, second end 114, bottom side 117, first side 118 or second side 119 of the pressure adjustment vessel 110. Further, in one or more examples of embodiments, the atmospheric pressure adjustment assembly or device 140 may be freestanding and not attached to the pressure adjustment vessel 110.

As shown in FIGS. 1 and 2, the atmospheric pressure adjustment assembly 140 and the atmospheric pressure control assembly 160 may be connected to the pressure adjustment vessel 110 through a series of ports, pipes, and valves. As explained in further detail, the pressure adjustment vessel 110 may include a first vessel port or orifice or passage 142. As illustrated in FIGS. 1 and 2, the first vessel port 142 may be positioned on the top side 116 of the pressure adjustment vessel 110. The first vessel port 142 may be a vacuum port having a passage between the inner chamber 111 and the top side 116 of the pressure adjustment vessel 110. In one or more examples of embodiments, the first vessel port 142 may be connected to the first end 112, second end 114, bottom side 117, first side 118 or second side 119 of the pressure adjustment vessel 110.

The first vessel port 142 of the pressure adjustment vessel 110 may be further connected to the atmospheric pressure adjustment assembly 140. As illustrated in FIGS. 1 and 2, the first vessel port 142 may include a first pipe or line or duct 144. The first pipe 144 may connect the first vessel port 142 with the atmospheric pressure adjustment assembly 140. In one or more examples of embodiments, the first pipe 144 may be a plastic or metal tube or pipe. The first pipe 144 may be connected to the first vessel port 142 and the atmospheric pressure adjustment assembly 140 by pipe clamp, pipe coupling, crimping or any other known or future developed fastening device or process. In one or more examples of embodiments, the first pipe 144 may be polyvinyl chloride (PVC) tubing or piping, copper piping, polystyrene tubing or piping, polysulfone tubing or piping, or any other thermoplastic, synthetic or metallic tube or pipe with sufficient strength and durability to transmit a vacuum between the atmospheric pressure adjustment assembly 140 and the inner chamber 111 of the pressure adjustment vessel 110.

As shown in FIGS. 1 and 2, the first pipe 144 may include a first valve 146. The first valve 146 may be positioned along first pipe 144 between the atmospheric pressure adjustment assembly 140 and the first vessel port 142 of the pressure adjustment vessel 110. The first valve 146 may be a solenoid valve. In one or more examples of embodiments, the first valve 146 may be a motor valve, ball valve, or other electromechanical, pneumatic, or motor operated actuating valve.

The pressure adjustment vessel 110 may include a second vessel port or orifice or passage 147. As illustrated in FIGS. 1 and 2, the second vessel port 147 may be positioned on the top side 116 of the pressure adjustment vessel 110. The second vessel port 147 may be an atmospheric port having a passage between the inner chamber 111 and the top side 116 of the pressure adjustment vessel 110. The second vessel port 147 may have a first atmospheric access end 148 positioned on the second vessel port 147 away from the pressure adjustment vessel 110. In one or more examples of embodiments, the second vessel port 147 may be connected to the first end 112, second end 114, bottom side 117, first side 118 or second side 119 of the pressure adjustment vessel 110.

As shown in FIGS. 1 and 2, the second vessel port 147 may include a second valve 149. The second valve 149 may be positioned upon the second vessel port 148 between the inner chamber 111 of the pressure adjustment vessel 110 and the first atmospheric access end 148 or the second vessel port 147. The second valve 149 may be a solenoid valve. In one or more examples of embodiments, the second valve 149 may be a motor valve, ball valve, or other electromechanical, pneumatic, or motor operated actuating valve.

The pressure adjustment vessel 110 may include a third vessel port or orifice or passage 150. As illustrated in FIGS. 1 and 2, the third vessel port 150 may be positioned on the top side 116 of the pressure adjustment vessel 110. The third vessel port 150 may have a passage between the inner chamber 111 and the top side 116 of the pressure adjustment vessel 110. The third vessel port 150 may have an attached vacuum switch or vacuum measurement device 151. The vacuum measurement device 151 generally is a piezoelectric device or sensor which measures the atmospheric pressure within the inner chamber 111 of the pressure adjustment vessel 110 and sends a signal, either analog or digital, to the atmospheric pressure control assembly 160. In one or more examples of embodiments, the third vessel port 150 may be connected to the first end 112, second end 114, bottom side 117, first side 118 or second side 119 of the pressure adjustment vessel 110. Further, in one or more examples of embodiments, the vacuum measurement device 151 may be a fiber optic sensor, mechanical deflection sensor, a strain gauge a microelectromechanical system (MEMS) sensor, a vibrating sensor, a variable capacitance sensor, or any other known or future developed pressure gauge or sensor.

As illustrated in FIG. 2, the atmospheric pressure control assembly or device 160 may be attached to the top portion 116 of the pressure adjustment vessel 110. The atmospheric pressure control assembly 160 may be in communication with or connected to the atmospheric pressure adjustment assembly 140, the first valve 146, second valve 149 and vacuum measurement device 151. Specifically, the atmospheric pressure control assembly 160 may be in communication with or connected to the atmospheric pressure adjustment assembly 140 sufficient to control and regulate the rate of vacuum and amount of vacuum applied to the inner chamber 111 of the pressure adjustment vessel 110. Further, the atmospheric pressure control assembly 160 may be in communication with or connected to the first and second valves 146, 149 to enable the atmospheric pressure control assembly 160 to actuate the valves 146, 149. The atmospheric pressure control assembly 160 may be in communication with or connected to the vacuum measurement device 151, allowing the atmospheric pressure control assembly 160 to receive and interpret the analog or digital signal measuring the atmospheric pressure in the inner chamber 111 of the pressure adjustment vessel 110. The atmospheric pressure control assembly 160 may be or may include a pre-programmed controller which controls the atmospheric pressure adjustment assembly 140, the first valve 146 and second valve 149, and receives atmospheric pressure information from the vacuum measurement device 151. The atmospheric pressure control assembly 160 may include a manual control or button or lever to begin or end the euthanasia cycle. In one or more examples of embodiments, the atmospheric pressure control assembly 160 may be in communication with or connected to the atmospheric pressure adjustment assembly 140, the first valve 146, second valve 149 and vacuum measurement device 151 by wire, remote, or other communication device sufficient to receive and transmit information and commands. In one or more examples of embodiments, the atmospheric pressure control assembly 160 may be a digital pressure controller or transmitter, analog pressure controller or transmitter, logic controller, computer, or other controller or transmitter able to control and regulate the internal atmospheric pressure of the pressure adjustment vessel 110 and further implement process control based upon a pre-programmed set of criteria. In one or more examples of embodiments, the atmospheric pressure control assembly 160 may be attached to the first end 112, second end 114, bottom side 117, first side 118 or second side 119 of the pressure adjustment vessel 110. Further, in one or more examples of embodiments, the atmospheric pressure control assembly 160 may be freestanding and not attached to the pressure adjustment vessel 110. In one or more examples of embodiments, the atmospheric pressure control assembly 160 may be attached to the pressure adjustment vessel 110 by bolt, weld, adhesive, or any other known or future developed method of attachment.

As illustrated in FIG. 2, a first power supply assembly or cord 161 may be connected to the atmospheric pressure control assembly or device 160. The first power supply assembly or cord 161 may have an adapter for engaging a standard alternating current (AC) power outlet or socket. The atmospheric pressure control assembly or device 160 may have a second power supply and communication assembly or cord 162. The second power supply and communication assembly or cord 162 may connect the atmospheric pressure control assembly or device 160 with the atmospheric pressure adjustment assembly 140, supplying both power and communication signals to control and operate the atmospheric pressure adjustment assembly 140. In one or more examples of embodiments, the first power supply assembly or cord 161 may be adapted to engage a direct current (DC) power source. Further, in one or more examples of embodiments, the first power supply assembly or cord 161 may be hardwired to electricity or other power source. In one or more examples of embodiments, the atmospheric pressure adjustment assembly 140 may have an additional cord (not shown) to supply electricity or power directly from a source of electricity or power to the atmospheric pressure adjustment assembly 140. Further, in one or more examples of embodiments, the atmospheric pressure adjustment assembly 140 may have a discrete power source, for example a battery.

As illustrated in FIGS. 3, 4 and 6, the pressure adjustment vessel 110 may include an internal chamber assembly 170. The internal chamber assembly 170 may be adapted to removably receive an animal retention device or cage 180. The internal chamber assembly 170 may include a second assembly portion 174. The second assembly portion 174 may be attached or connected to the inner chamber 111 of the pressure adjustment vessel 110. The second assembly portion 174 generally is static and does not move in relation to the pressure adjustment vessel 110. Attached to the second assembly portion 174 may be low friction members 176. Low friction members 176 may be one or more ultra high molecular weight (UHMW) slides, such as, but not limited to, polyethylene or other similar thermoplastic polymers. The low friction members 176 allow the animal retention device 180 to easily slide along the second assembly portion 174 during placement and removal of the animal retention device 180 within the pressure adjustment vessel 110. In one or more examples of embodiments, the internal chamber assembly 170 may include a first assembly portion (not shown) and a second assembly portion 174. The first assembly portion may be slidably connected to the second assembly portion 174. When the chamber access door 120 is in the closed position, the first assembly portion generally overlaps the second assembly portion 174. Attached between the first and second assembly portions 174 may be one or more low friction members 176. In one or more examples of embodiments, the first assembly portion may be attached to the second assembly portion 174 by a rack and pinion arrangement.

Figure 5:
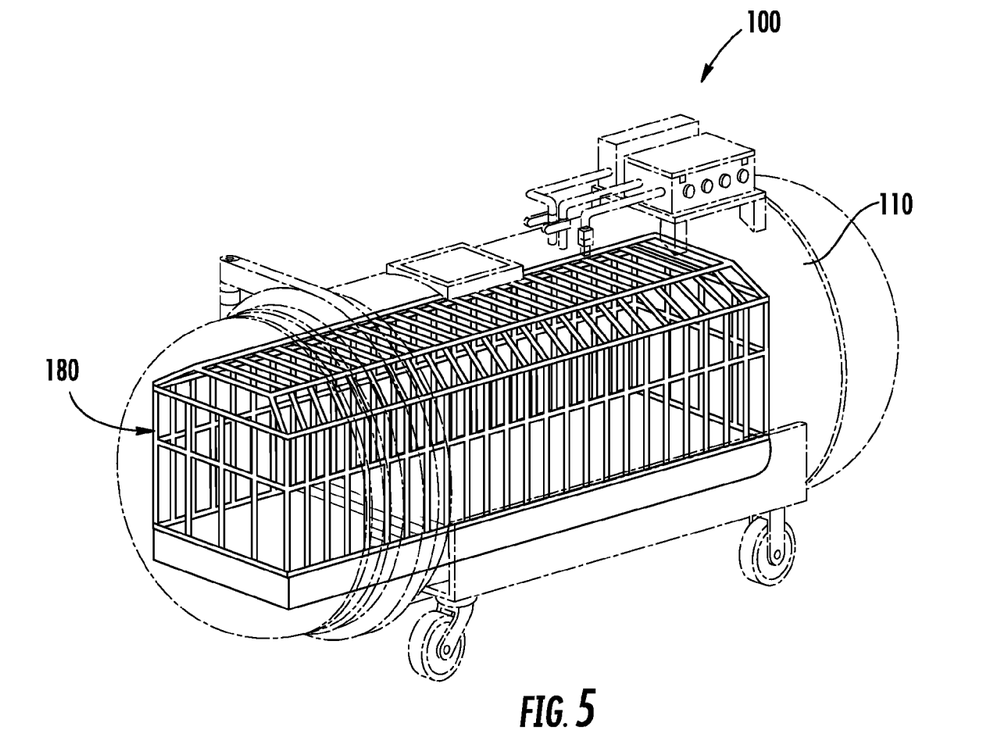
FIG. 5 is an isometric view of the hypoxic euthanasia device of FIG. 1, illustrating the interior structural features of the euthanasia device, the exterior structural features being generally shown in dashed lines.
Figure 7:
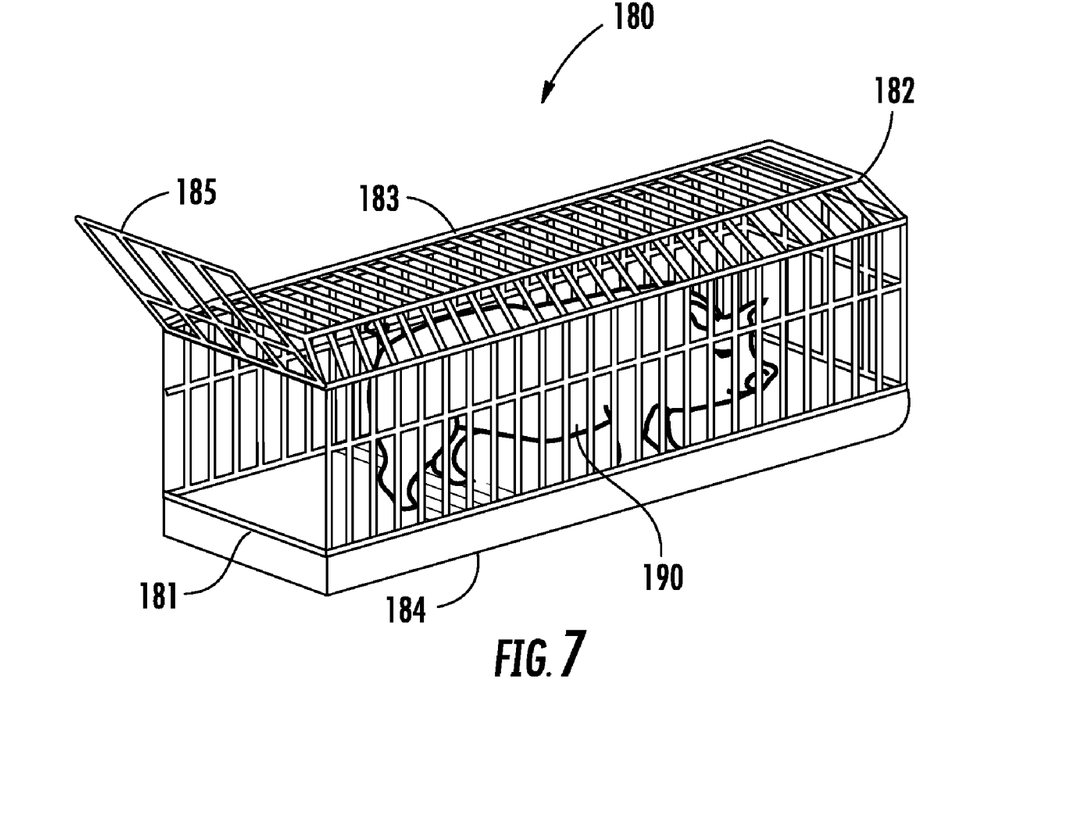
FIG. 7 is an isometric view of an animal retention device according to one of more examples of embodiments for use with the hypoxic euthanasia device of FIG. 1.

As shown in FIGS. 5 and 6, the pressure adjustment vessel 110 may include an animal retention device or cage 180. As illustrated in FIG. 7, the animal retention device or cage 180 is generally rectangular in shape, but it is contemplated that the animal retention device 180 may be formed of any shape without departing from the overall scope of the present invention. The animal retention device 180 may be formed of different lengths, widths and diameters to compensate for different sized animals 190. The animal retention device 180 is generally formed of steel bars or other similar material of sufficient strength to withstand variable or changing internal atmospheric pressure and the stresses placed upon the pressure adjustment vessel or chamber or assembly 110 thereby. To this end, the animal retention device 180 may be formed of carbon fiber, copper, aluminum, synthetic material, composite material, or any other known or future discovered material with sufficient strength to structurally withstand changing internal pressure conditions, and specifically to withstand low atmospheric pressure within the pressure adjustment vessel or chamber or assembly 110 while retaining an animal 190. Further, the animal retention device 180 may be formed of material with sufficient strength to appropriately confine and retain animal 190 while able to structurally withstand the forces placed upon the animal retention device 180 by animal 190.

As best illustrated in FIG. 7, the animal retention device or cage 180 may include a first end 181, a second end 182, a top or upper portion 183 and a bottom or lower portion 184. Top or upper portion 183 and bottom or lower portion 184, may extend generally parallel to one another and extend generally along the animal retention device 180. The top or upper portion 183 is generally a distance away from the ground or surface, while the bottom or lower portion 184 is generally closer to the ground or surface. The top or upper portion 183 and bottom or lower portion 184 may be spaced apart from each other by first end 181 and second end 182. The animal retention device 180 may have an interior portion that is substantially hollow to removably receive an animal 190. Connected to the first end 181 may be an access door 185 to allow access to the interior portion of the animal retention device 180. The access door 185 may be hinged, may slide, or may be removable from the animal retention device 180. Further, the access door 185 may be top opening or side opening. In one or more examples of embodiments, the access door 185 may connected to the second end 182, the top or upper portion 183 or bottom or lower portion 184 of the animal retention device 180. Further, in one or more examples of embodiments, the access door 185 may include a locking assembly (not shown) to lock the access door 185 to the animal retention device 180.

One method of animal euthanasia not currently in use is to simulate atmospheric conditions at high altitude to create hypoxia. Hypoxia is a pathological condition in which there is abnormally low oxygen availability to the body or an individual tissue or organ of a human or animal. Hypoxia can be simulated by decreasing atmospheric pressure to simulate the atmosphere of high altitude. Exposure to the reduced atmospheric pressure at high altitude, or less dense air, leads to hypoxia. Hypoxia from exposure to reduced atmospheric pressure is subtle, as a human or animal will experience symptoms followed by overt incapacitation. In humans, the only outward, physical signs of exposure to reduced atmospheric pressure are an increase in respiration rate and an increase in heart rate. Other symptoms may include euphoria, lightheaded sensation and dizziness, followed by loss of consciousness and death. As altitude increases, the time before incapacitation decreases, for example, a human may have between nine and fifteen seconds before losing consciousness upon exposure to atmospheric conditions at 40,000 feet above sea level. Accordingly, it would be advantageous to euthanize animals by exposure to high altitude atmospheric conditions, as the gradual and subtle symptoms of hypoxia are mild and quickly result in incapacitation, leading to a quick, effective and reliable for the method of euthanasia.

In operation and use of the hypoxic euthanasia device 100, the pressure adjustment vessel 110 may be provided with the chamber access door 120 in the open position, as best illustrated in FIG. 4. A user may begin by placing an animal 190 into the animal retention device 180. As illustrated in FIG. 6, the animal 190 may be a pig or hog. The user opens the access door 185 of the animal retention device 180, and places the animal 190 into the animal retention device 180. The user then shuts the access door 185 and may optionally lock the access door 185 to the animal retention device 180.

The user may then place the animal retention device 180 onto the internal chamber assembly 170. As shown in FIGS. 3 and 4, the internal chamber assembly 170 may be adapted to removably receive the animal retention device or cage 180. When the chamber access door 120 is in an open position, the user may slide the animal retention device 180 along the low friction members 176 until the animal retention device 180 is removably received by the inner chamber 111 of the pressure adjustment vessel 110 and the animal retention device 180 is removably received by the second assembly portion 174. In one or more examples of embodiments, where the internal chamber assembly 170 includes a first assembly portion and a second assembly portion 174, when the chamber access door 120 is in an open position, the first assembly portion may slide away from the second assembly portion 174 and toward the first end 112 of the pressure adjustment vessel 110, eventually sliding out of the inner chamber 111. This provides access to the first assembly portion from the first end 112 of the pressure adjustment vessel 110. The user may position the animal retention device 180 upon the first assembly portion, which may be adapted to removably receive the animal retention device 180. The user may then slide the first assembly portion along low friction member 176 until the first assembly portion is received within the inner chamber 111 of the pressure adjustment vessel 110. The low friction member 176 enables the first assembly portion to slide in relation to the second assembly portion 174 while minimizing friction and resistance between the first and second assembly portions. When the first assembly portion is received within the inner chamber 111, the first assembly portion generally overlaps the second assembly portion 174.

Once the animal retention device 180 is removably received by the inner chamber 111 of the pressure adjustment vessel 110, as illustrated in FIG. 6, the user may close the chamber access door 120. The user may apply force upon push bar 128 to rotate chamber access door 120 about the chamber access retention device 122 until the chamber access door 120 reaches the closed position, generally when the chamber access retention device 122 engages or comes into contact with the pressure adjustment vessel 110, as illustrated in FIG. 1. In one or more examples of embodiments, where the pressure adjustment vessel 110 includes a locking assembly, the user may engage the locking assembly to lock the chamber access door 120 to the pressure adjustment vessel 110.

The user may initiate the euthanasia by hypoxia process to euthanize the animal 190. The user begins by actuating or activating the euthanasia process through the atmospheric pressure control assembly 160. The atmospheric pressure control assembly 160 includes a pre-programmed control strategy to simulate the atmospheric pressure of a gradual ascent in altitude from the ambient atmospheric pressure around the pressure adjustment vessel 110, for example sea level, to 40,000 feet. As a baseline, the atmospheric pressure at sea level is approximately 14.69 pounds per square inch (psi) or 29.92 inches of mercury (in. Hg). As altitude increases, the corresponding reduction in atmospheric pressure is not linear, as illustrated by the following table:

| Altitude (feet above sea level) | Atmospheric Pressure (psi) | Atmospheric Pressure (in. Hg) |
|---|---|---|
| 0 | 14.69 | 29.92 |
| 5,000 | 12.23 | 24.90 |
| 10,000 | 10.10 | 20.58 |
| 15,000 | 8.29 | 16.89 |
| 20,000 | 6.76 | 13.76 |
| 25,000 | 5.46 | 11.12 |
| 30,000 | 4.37 | 8.90 |
| 35,000 | 3.47 | 7.06 |
| 40,000 | 2.73 | 5.56 |

The pre-programmed control strategy simulates a gradual and steady increase in altitude of 3,000 to 5,000 feet per minute by adjusting the atmospheric pressure within the inner chamber 111 of the pressure adjustment vessel 110 to correspond with the atmospheric pressure at various altitudes. Based upon a rate of ascent of 3,000 to 5,000 feet per minute, the inner chamber 111 will take between eight and thirteen minutes to reach the target atmospheric pressure of 40,000 feet above sea level. In one or more examples of embodiments, the amount of time required to reach the target atmospheric pressure may be shorter or greater than eight to thirteen minutes based upon the ambient atmospheric pressure, beginning altitude of the pressure adjustment vessel 110 in relation to sea level, the size of the pressure adjustment vessel 110, and the size of the atmospheric pressure adjustment assembly 140.

Once the euthanasia by hypoxia process begins or is initiated, the atmospheric pressure control assembly 160 communicates with the atmospheric pressure adjustment assembly 140 to begin operation and generation of a vacuum. Concurrently, the atmospheric pressure control assembly 160 may signal or actuate the first valve 146 into an open position, enabling the connected atmospheric pressure adjustment assembly 140 to begin reducing the atmospheric pressure within the inner chamber 111 of the pressure adjustment vessel 110 according to the pre-programmed control strategy. As the atmospheric pressure decreases, the vacuum generated is sufficient to restrict the opening or lock the chamber access door 120 to the pressure adjustment vessel 110. During the simulated increase in altitude and concurrent reduction in atmospheric pressure, the atmospheric pressure control assembly 160 receives measurement readings or data of the atmospheric pressure within the inner chamber 111 of the pressure adjustment vessel 110 from the vacuum measurement device 151. Based upon the atmospheric pressure measurement readings or data, the atmospheric pressure control assembly 160 may direct the atmospheric pressure adjustment assembly 140 to increase or decrease the amount of vacuum and correspondingly, atmospheric pressure, based upon the provided control strategy to simulate the atmospheric pressure during a rate of ascent of 3,000 to 5,000 feet per minute.

Once the inner chamber 111 of the pressure adjustment vessel 110 reaches a target atmospheric pressure corresponding to the target altitude of 40,000 feet above sea level, the atmospheric pressure control assembly 160 will maintain the atmospheric pressure for a period of time to euthanize the animal 190. Accordingly, the atmospheric pressure control assembly 160 will receive measurement readings or data of the atmospheric pressure within the inner chamber 111 of the pressure adjustment vessel 110 from the vacuum measurement device 151. Based upon the measurement readings or data, the atmospheric pressure control assembly 160 will communicate with the atmospheric pressure adjustment assembly 140 to increase or decrease the amount of vacuum and correspondingly, atmospheric pressure, within the inner chamber 111 of the pressure adjustment vessel 110 to maintain the target atmospheric pressure. Based upon data generated from exposure to high altitude atmospheric conditions on humans, the estimated period of time needed to maintain the atmospheric pressure within the inner chamber 111 of the pressure adjustment vessel 110 is four minutes. In one or more examples of embodiments, the target atmospheric pressure within the inner chamber 111 may be greater than or less than the atmospheric pressure at the target altitude of 40,000 feet above sea level. Further, in one or more examples of embodiments, the pre-determined or period of time during which the atmospheric pressure is maintained may be less than four minutes or greater than four minutes.

During the period the atmospheric pressure is maintained within the inner chamber 111 of the pressure adjustment vessel 110, the user may optionally view or inspect the animal 190 through the viewing portal 130. This may allow the user to determine if the euthanasia process is properly proceeding with minimal pain and distress placed upon the animal 190. An alternative monitoring system may also be employed.

Upon completion of the time period under which the atmospheric pressure within the inner chamber 111 is maintained at a target atmospheric pressure, the atmospheric pressure control assembly 160 may automatically end the euthanasia cycle. Alternatively, in one or more examples of embodiments, the atmospheric pressure control assembly 160 may include a manual control to end the euthanasia cycle. This may require the user to manually actuate a control or button or lever on the atmospheric pressure control assembly 160 to end the euthanasia cycle.

Once the euthanasia cycle has ended, the inner chamber 111 of the pressure adjustment vessel 110 is returned to ambient atmospheric pressure, specifically the atmospheric pressure surrounding the outside of the pressure adjustment vessel 110. The atmospheric pressure control assembly 160 may send a signal to the atmospheric pressure adjustment assembly 140 to cease operation and application of a vacuum within the inner chamber 111 of the pressure adjustment vessel 110. The atmospheric pressure control assembly 160 may then signal or actuate the first valve 146 into a closed position. Concurrently, the atmospheric pressure control assembly 160 may signal or actuate the second valve 149 into an open position, enabling the connected second vessel port 147 and first atmospheric access end 148 to release the vacuum within the inner chamber 111, and equilibrate the atmospheric pressure within the inner chamber 111 to the atmospheric pressure outside of the pressure adjustment vessel 110, for example ambient or sea level atmospheric pressure. The atmospheric pressure within the inner chamber 111 may reach equilibrium with the atmospheric pressure outside of the pressure adjustment vessel 110 at a controlled rate communicated by atmospheric pressure control assembly 160. In one of more example of embodiments, the atmospheric pressure within the inner chamber 111 may reach equilibrium with the atmospheric pressure outside of the pressure adjustment vessel 110 without control of the rate of vacuum release.

Once the inner chamber 111 of the pressure adjustment vessel 110 reaches ambient atmospheric pressure, the atmospheric pressure control assembly 160 may signal or actuate the second valve 149 into a closed position. The euthanasia cycle is complete and the chamber access door 120 of the pressure adjustment vessel 110 may be opened. Chamber access door 120 may be opened by applying force to the push bar 128. In one or more examples of embodiments, where the pressure adjustment vessel 110 includes a locking assembly, the user may disengage the locking assembly to unlock the chamber access door 120 from the pressure adjustment vessel 110 prior to opening the chamber access door 120.

Upon opening the chamber access door 120, the user may confirm that the animal 190 has been euthanized. The animal retention device 180 may be removed or withdrawn from the inner chamber 111 of the pressure adjustment vessel 110. Once withdrawn, the access door 185 of the animal retention device 180 may be opened and the euthanized animal 190 may be removed. Once the euthanized animal 190 is removed, another animal 190 may be placed within the pressure adjustment vessel 110 and the euthanasia process may be repeated.

The pressure adjustment vessel 110 may be moved to a different location for use or storage. Referring generally to FIG. 1, a user may move the pressure adjustment vessel 110 by applying force on push bar 128. Upon application of force on the push bar 128, the force translates to the first and second wheel assemblies 132, 134 and first and second wheels 133, 135 of the pressure adjustment vessel 110. This enables the pressure adjustment vessel 110 to roll upon the first and second wheel assemblies 132, 134, allowing a user to move the pressure adjustment vessel 110 to a different location to continue euthanasia of animals 190 or to a different location for storage of the pressure adjustment vessel 110.

The hypoxic euthanasia device 100 described herein has several advantages. The hypoxic euthanasia device 100 provides a quick, effective and humane method of euthanasia by simulating the atmospheric pressure of high altitude and using hypoxia to kill the animal 190. Exposure to atmospheric conditions of gradually increasing altitude results in a subtle onset of hypoxia. The animal will experience mild symptoms, such as euphoria, lightheaded sensation and dizziness, followed by loss of consciousness and death. Accordingly euthanasia by hypoxia through exposure of increasing altitude atmospheric conditions is humane, minimizes suffering to animals, quick, effective and reliable. Further, the hypoxic euthanasia device 100 allows for euthanasia of animals without risk to other animals from poisons or chemicals. The animal 190 is euthanized via hypoxia caused by exposure to decreasing atmospheric pressure. No chemicals, poisons, or controlled substances are introduced into the animal 190. Accordingly, no special steps are required for disposing of the animal carcass to prevent exposure to healthy animals or savaging animals from chemical, poison or controlled substance residues.

Another advantage of euthanasia through the hypoxic euthanasia device 100 is the process is not aesthetically objectionable to individuals administering the euthanasia or onlookers. The animal 190 is confined and sealed within the pressure adjustment vessel 110. The individuals administering the euthanasia or onlookers may choose to inspect or watch the euthanasia process through the inspection portal 130, however the choice is optional. The administering individual or onlooker need not view the process, and the process generally occurs within the sealed pressure adjustment vessel 110. Upon completion of euthanasia, the animal 190 is removed intact, without an objectionable residual appearance.

Additionally, the hypoxic euthanasia device 100 allows for euthanasia of animals 190 while reducing the risk of injury to the person administering euthanasia, onlookers or nearby animals. The animal 190 is placed into the animal retention device 180, which calms the animal 190 during placement in the hypoxic euthanasia device 100 and provides a barrier between the animal 190 and the administering individual, onlooker or nearby animal. The animal 190, and animal retention device 180, is placed within the inner chamber 111 of the pressure adjustment vessel 110, which is then sealed by closing chamber access door 120. Accordingly, this provides protection through multiple layers of physical separation or barriers between the animal 190 set to be euthanized and administering individuals, onlookers and nearby animals.

In addition, the euthanasia process does not require physical euthanasia steps. Further, the euthanasia process is dependable and reliable, minimizing, or even precluding, the requirement of a secondary euthanasia step. The hypoxic euthanasia device 100, through the pre-programmed control strategy of the atmospheric pressure control assembly 160, reliably euthanizes animals 190 and reduces the necessity of secondary euthanasia steps, such as exsanguination or pithing. In addition, the hypoxic euthanasia device 100 reduces costs, and does not require handling and storage of consumable raw materials, such as gases used during euthanasia. The hypoxic euthanasia device 100 uses atmospheric pressure and a reduction in oxygen to euthanize animals. The hypoxic euthanasia device 100 does not require additional chemicals, gases, equipment, or raw materials. Accordingly, other than purchasing and maintaining the hypoxic euthanasia device 100 itself, a user will not incur costs related to procurement, delivery, handling, or storage of consumable raw materials used during euthanasia.

Further, the hypoxic euthanasia device 100 may be used without licensed or specialized personnel. The hypoxic euthanasia device 100 does not require a veterinarian or other specialized individual. Once trained in operation of the hypoxic euthanasia device 100, any individual may readily conduct euthanasia of animals. This benefits a user, as euthanasia may occur quickly without waiting for licensed or specialized personnel, decreasing the amount of time an animal 190 may suffer.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to one or more examples of embodiments outlined above, various alternatives, modifications, variations, improvements and/or substantial equivalents, whether known or that are or may be presently foreseen, may become apparent to those having at least ordinary skill in the art. Accordingly, the one or more examples of embodiments of the invention, as set forth above, are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A euthanasia device for euthanizing animals through hypoxia, the euthanasia device comprising:
    a pressure adjustment vessel having an inner chamber and first and second ends;
    the inner chamber having an inner pressure;
    a chamber access door in communication with the first end of the pressure adjustment vessel;
    an atmospheric pressure adjustment assembly in communication with the pressure adjustment vessel; and
    an atmospheric pressure control assembly in communication with the pressure adjustment vessel;
    wherein said euthanasia device is located in an environment with an exterior pressure; and
    wherein said atmospheric pressure adjustment assembly is activated to reduce said inner pressure below said exterior pressure to euthanize an animal.

2. The euthanasia device of claim 1, wherein the atmospheric pressure control assembly is in communication with the atmospheric pressure adjustment assembly.

3. The euthanasia device of claim 2, wherein:
    the atmospheric pressure adjustment assembly is attached to the pressure adjustment vessel; and
    the atmospheric pressure control assembly is attached to the pressure adjustment vessel.

4. The euthanasia device of claim 2, wherein the pressure adjustment vessel further comprises a first vessel port and a second vessel port.

5. The euthanasia device of claim 4, wherein:
    the atmospheric pressure adjustment assembly is in communication with the first vessel port; and
    the atmospheric pressure control assembly is in communication with the second vessel port.

6. The euthanasia device of claim 1, wherein the pressure adjustment vessel further comprises an inspection portal.

7. The euthanasia device of claim 1, further comprising a wheel assembly for carrying the pressure adjustment vessel.

8. The euthanasia device of claim 7, wherein the wheel assembly is attached to a bottom portion of the pressure adjustment vessel.

9. The euthanasia device of claim 1, wherein the chamber access door is attached to the first end of the pressure adjustment vessel by a chamber access retention device.

10. The euthanasia device of claim 1, further comprising an animal retention device removably received within the inner chamber of the pressure adjustment vessel.

11. The euthanasia device of claim 10, wherein the animal retention device further comprises:
    a first end;
    a second end; and
    an access door connected to the first end.

12. A hypoxic euthanasia device for euthanizing an animals, the euthanasia device comprising:
    a pressure adjustment vessel having a top portion;
    a chamber having a chamber pressure;
    a chamber access door attached to the pressure adjustment vessel by a chamber access retention device;
    an atmospheric pressure adjustment assembly in communication with the pressure adjustment vessel;

an atmospheric pressure control assembly in communication with the pressure adjustment vessel; and an inspection portal in communication with the top portion of the pressure adjustment vessel;

wherein said atmospheric pressure adjustment assembly is activated to reduce said chamber pressure to euthanize said animal.

13. The euthanasia device of claim 12, further comprising:

a first vessel port in communication with the pressure adjustment vessel;

a second vessel port in communication with the pressure adjustment vessel;

a first valve attached to the first vessel port; and a second valve attached to the second vessel port.

14. The euthanasia device of claim 13, wherein:

the atmospheric pressure adjustment assembly is attached to the first vessel port by a first line;

the atmospheric pressure adjustment assembly is in communication with the atmospheric pressure control assembly; and the atmospheric pressure control assembly is in communication with the first and second valves.

* * * * *